United States Patent
Liu et al.

(10) Patent No.: US 10,703,092 B1
(45) Date of Patent: Jul. 7, 2020

(54) SELF-ADVANCING CLEANER (71) Applicant: Xerox Corporation, Norwalk, CT (US)

(72) Inventors: Chu-Heng Liu, Penfield, NY (US);
Jason Lefevre, Penfield, NY (US);
Seemit Praharaj, Webster, NY (US);
Paul McConville, Webster, NY (US);
Douglas Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/266,536

(22) Filed: Feb. 4, 2019

(51) Int. Cl.
*B41F 35/00* (2006.01)
*B08B 1/02* (2006.01)
*B65G 45/12* (2006.01)

(52) U.S. Cl.
CPC .............. *B41F 35/001* (2013.01); *B08B 1/02* (2013.01); *B65G 45/12* (2013.01)

(58) Field of Classification Search
CPC .......... B41F 35/001; B08B 1/02; B65G 45/12
See application file for complete search history.

(56) References Cited

U.S. PATENT DOCUMENTS

| | | | |
|---|---|---|---|
| 5,526,028 A | 6/1996 | Rottman | |
| 6,679,601 B1 * | 1/2004 | Pham | B41J 11/007 134/6 |
| 8,406,673 B2 | 3/2013 | Rimai | |
| 8,509,671 B2 | 8/2013 | Kimura et al. | |
| 9,827,795 B2 | 11/2017 | Hara et al. | |
| 10,086,625 B1 | 10/2018 | LeFevre et al. | |
| 2006/0039727 A1 | 2/2006 | Lofthus et al. | |
| 2015/0210065 A1 | 7/2015 | Kelly et al. | |
| 2017/0217150 A1 | 8/2017 | Moore et al. | |
| 2018/0081302 A1 | 3/2018 | Wu et al. | |
| 2018/0136888 A1 | 5/2018 | Robinson et al. | |
| 2018/0281456 A1 | 10/2018 | McConville et al. | |
| 2018/0281465 A1 | 10/2018 | Liu et al. | |
| 2018/0284687 A1 | 10/2018 | Ando et al. | |
| 2018/0290172 A1 | 10/2018 | LeFevre et al. | |
| 2018/0341444 A1 | 11/2018 | Smith | |

OTHER PUBLICATIONS

Xerox® Brenva® HD Production Inkjet Press, 2018 Xerox Corporation.
"Why does moisture sometimes seem to cause More friction?", quora.com, downloaded Dec. 10, 2018.
SheetFeeder BV, Jet speed productivity, 2018 Tecnau.
Xerox® Brenva™ HD Production Inkjet Press Overview, 2016 Xerox Corporation.

* cited by examiner

*Primary Examiner* — G. M. A Hyder
(74) *Attorney, Agent, or Firm* — Kermit D. Lopez; Luis M. Ortiz; Ortiz & Lopez, PLLC (57) ABSTRACT

A self-advancing cleaner and a method of operating the self-advancing cleaner. In an embodiment, a rotatable member can engage a transport belt, wherein the rotatable member includes a cleaning surface comprising a surface sufficiently rough to collect and take away ink debris from the transport belt. During a cleaning operation the cleaning surface remains stationary while the transport belt moves in a sliding relative motion with respect to the cleaning surface, which allows the ink debris to be collected on the cleaning surface. Once an ink contamination level associated with the ink debris attains a threshold and a set friction exceeds the threshold, the self-advancing cleaner advances.

20 Claims, 7 Drawing Sheets

FIG. 9

SELF-ADVANCING CLEANER

TECHNICAL FIELD

Embodiments are related to printing systems. Embodiments also relate to transports and transport belts utilized in printing systems. Embodiments are additionally related to cleaning devices used to clean transport belts and other transport members.

BACKGROUND

Printing systems known in the document reproduction arts can apply a marking material, such as ink or toner, onto a substrate such as a sheet of paper, a textile, metal, plastic and objects having a non-negligible depth such as a coffee cup, bottle, and the like.

A printing system can perform printing of an image or the like on sheets of paper, for example, by transporting a sheet of paper (or other substrates), which is an example of a medium, up to a position of a printing section using a transport roller, and an endless form transport belt, which can rotate while coming into contact with the sheet of paper, and discharging ink, which is an example of a liquid, toward the sheet of paper from a liquid discharging head. When ink, which can be discharged from the liquid discharging head, becomes attached to the outer surface of the transport belt, there is a concern that the ink may be transferred to sheets of paper that are transported by the transport belt, and that the sheets of paper will be stained.

In some printing systems, a particular type of transport or transport member, known as a marker transport, can become contaminated with aqueous ink, which can lead to an increase in frictional drag, a loss of drive capacity and image quality (pixel placement) degradation. To prevent contamination from reaching undesirable levels, a periodic belt-cleaning interval of one week, for example, and an even more extensive cleaning (e.g., ~250 Kp) may be needed and can require a skilled/trained operator for the printing system. This type of cleaning is currently difficult in some printing systems (e.g., ~20" cross-process width) and the additional width associated with such systems (e.g., ~32" cross-process width) can make this work even more difficult and time consuming with additional risk to damaging the transport belt. Some printing systems may include a market transport sub-system located near the floor, for example, may require the operator to kneel or lay on the floor during cleaning. A 20" width, for example, may be the widest transport that can be reasonably cleaned manually by anyone of typical arm length and dexterity.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a self-advancing cleaner for a transport belt.

It is another aspect of the disclosed embodiments to provide for a self-advancing cleaner that maintains contamination on a transport belt below a threshold.

If is a further aspect of the disclosed embodiments to provide for a self-advancing cleaner for a transport belt that can be implemented in a cleaning roll configuration or a cleaning web arrangement.

The aforementioned aspects and other objectives and advantages can now be achieved as described herein. A self-advancing cleaner and a method of operating the self-advancing cleaner are disclosed. In an embodiment, a rotatable member can engage a transport belt, wherein the rotatable member includes a cleaning surface comprising a surface sufficiently rough to collect and take away ink debris from the transport belt. During a cleaning operation the cleaning surface remains stationary while the transport belt moves in a sliding relative motion with respect to the cleaning surface, which allows the ink debris to be collected on the cleaning surface. Once an ink contamination level associated with the ink debris attains a threshold and a set friction exceeds the threshold, the self-advancing cleaner can advance.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems/devices. Accordingly, embodiments may, for example, take the form of hardware, software, firmware or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Additionally, the term "step" can be utilized interchangeably with "instruction" or "operation".

Unless defined otherwise, all technical and scientific terms used herein have the same meanings as commonly understood by one of ordinary skill in the art. As used in this document, the term "comprising" means "including, but not limited to."

Figure 7:
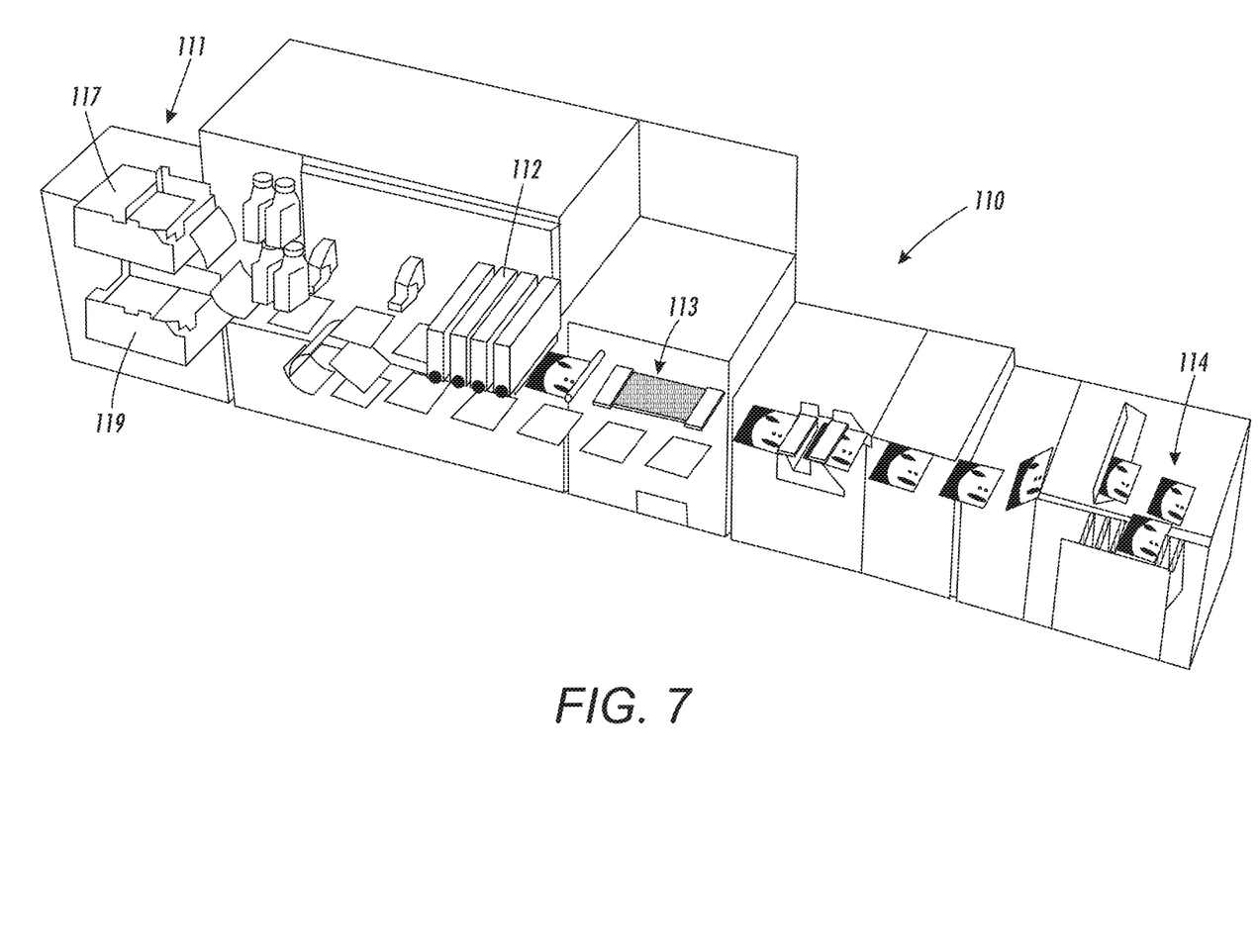
FIG. 7 illustrates a pictorial diagram depicting an example printing system in which an embodiment may be implemented.

The term "printing system" as utilized herein can relate to a printer, including digital printing devices and systems that accept text and graphic output from a computing device, electronic device or data processing system and transfers the information to a substrate such as paper, usually to standard size sheets of paper. A printing system may vary in size, speed, sophistication, and cost. In general, more expensive printers are used for higher-resolution printing. A printing system can render images on print media, such as paper or other substrates, and can be a copier, laser printer, bookmaking machine, facsimile, or a multifunction machine (which can include one or more functions such as scanning, printing, archiving, emailing, faxing and so on). An example of a printing system that can be adapted for use with one or more embodiments is shown in FIG. 7.

The term "transport belt" as utilized herein can relate to a belt implemented in a printing system in association in with a rotatable member such as a roller or other transport members or web transport configurations. Such a transport belt can be relate to marking transport or marker transport, which may become contaminated with aqueous ink. To permit a high registration accuracy, a printing system can employ such a transport belt, which in some implementations can pass in front of toner cartridges and each of the toner layers can be precisely applied to the transport belt. The combined layers can be then applied to the paper in a uniform single step. It should be appreciated, however, that the disclosed embodiments are not limited to printers that utilize toner. Ink and other types of marking media may be utilized in other printing embodiments. That is, a printing system is not limited to a laser printing implementation but may be realized in other contexts, such as ink-jet printing systems.

A "computing device" or "electronic device" or "data processing system" refers to a device or system that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like. Various elements of an example of a computing device or processor are described below in reference to FIGS. 8 and 9.

Figure 1:
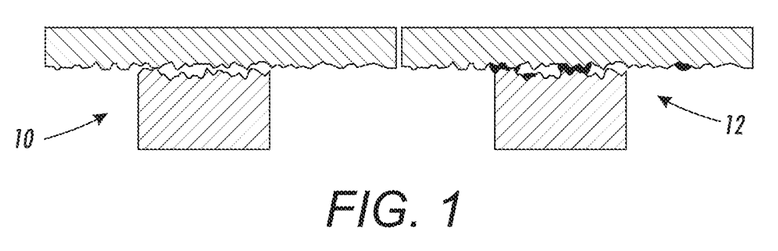
FIG. 1 illustrates schematic diagrams respectively depicting the concept of dry friction and wet friction.

FIG. 1 illustrates schematic diagrams 10 and 12 respectively depicting the concept of dry friction and wet friction. Dry friction, demonstrated by the schematic diagram 10 on the left side of FIG. 1, is proportional to the normal force, but more or less independent of the contact area. Wet friction, demonstrated by the schematic diagram 12 on the right side of FIG. 1, is the additional friction that can be introduced by liquid that has intimate contact (i.e. "wet") with both surfaces. There are two distinct mechanisms: 1) for low viscosity liquid, the capillary force dominates, is known as the "meniscus effect"; and 2) for high viscosity liquid, sticky, tacky materials (e.g., such as glue), the viscous shear dominates the friction.

The ink contamination problem that can be experienced with a marker transport may be more likely due to the viscous shear because the partly dried ink is very tacky. Irrespective of the detailed nature of this wet friction, it is important to know that the friction increases with contact area and contamination level.

As will be discussed in greater detail herein, the disclosed embodiments can use a rough/porous surface in good contact with a marker belt to pick up "sticky" ink debris. Under normal operation, a cleaning surface may be held static by a force/torque limiting mechanism, while the transport belt can slide over the cleaning surface with friction below a threshold of this set force/torque. As the transport belt contamination builds up, more ink debris may build up on the belt, and a cleaner can collect the ink debris. At the same time, the friction between the belt and the cleaning surface may also increase.

Once the contamination reaches a high enough level such that it causes the friction to exceed the pre-set threshold, the cleaning surface can start to move/advance. First, the leading edge part of the ink contaminated cleaning surface can be moved out of the cleaning contact zone, carrying away some ink debris, and second, the trailing part of the cleaner surface, which is fresh and free of ink debris, can move into the contact zone to collect ink debris.

Figure 2:
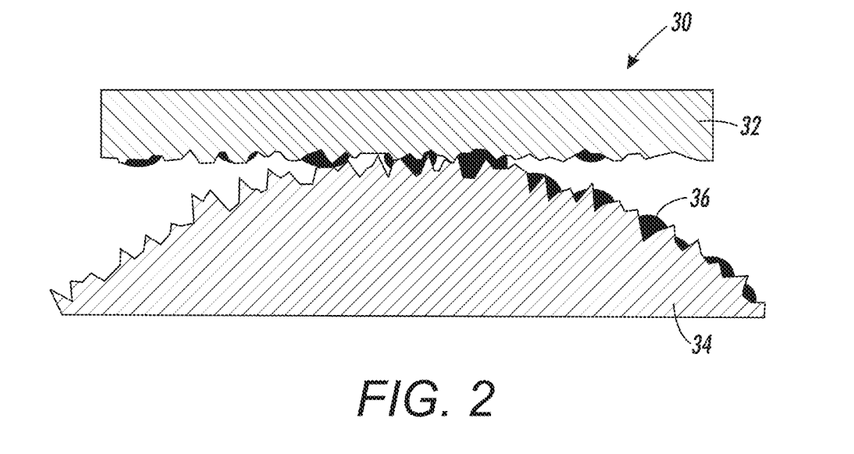
FIG. 2 illustrates a schematic diagram demonstrating the action of a cleaning mechanism.

FIG. 2 illustrates a schematic diagram demonstrating the action of a cleaning mechanism 30. A portion of a transport belt 32 is shown in FIG. 2 disposed above a rotatable member 34. The transport belt 32 and the rotatable 34 may come into contact with one another, and liquid or ink debris 36 may contaminate the transport belt 32 and rotatable member 34. It can be assumed that both rotatable member 34 and the transport belt 32 are implemented in the context of a printing system.

Figure 3:
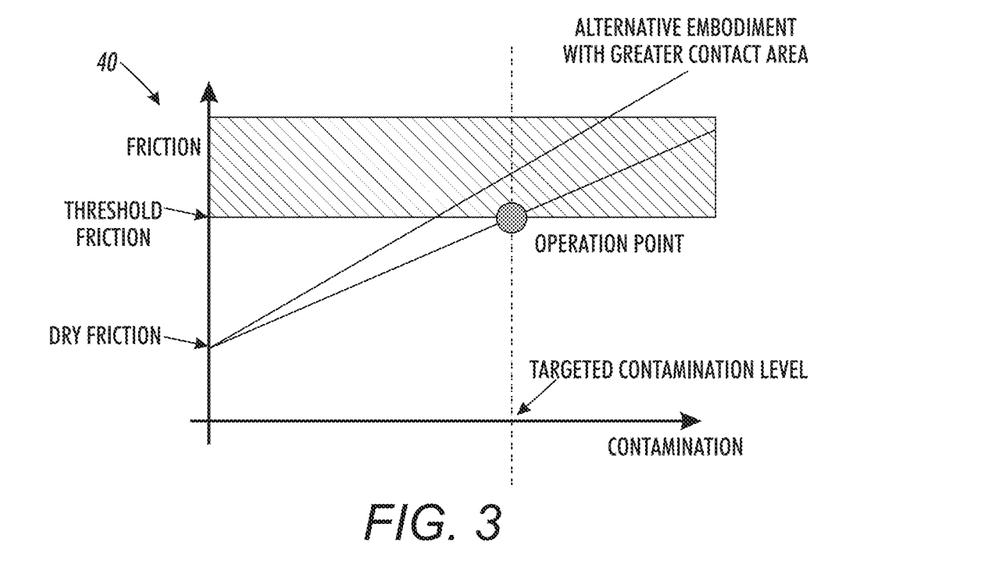
FIG. 3 illustrates a graph that demonstrates the relationship between a contamination level and cleaner friction.

FIG. 3 illustrates a graph 40 that demonstrates the relationship between a contamination level and cleaner friction. Graph 40 also shows the settings and operation latitude space of the cleaning mechanism 30 depicted in FIG. 2. Graph 40 demonstrates an expected behavior of the friction vs. contamination. Graph 40 also indicates alternative embodiment with greater contact area, which can be achieved by a greater belt wrap around the cleaner. With the same threshold, an embodiment with greater contact area can target at a lower contamination level (e.g., a cleaner belt).

An objective of the cleaner is not to keep the belt absolutely clean. The objective is to keep it clean enough such that the friction will not affect the belt motion. The level of contamination can be adjusted by adjusting the contact area between the belt and the cleaner. The contact area adjustment can be achieved through a belt wrap, pressure induced contact change, multiple contacts, etc.

Figure 4:
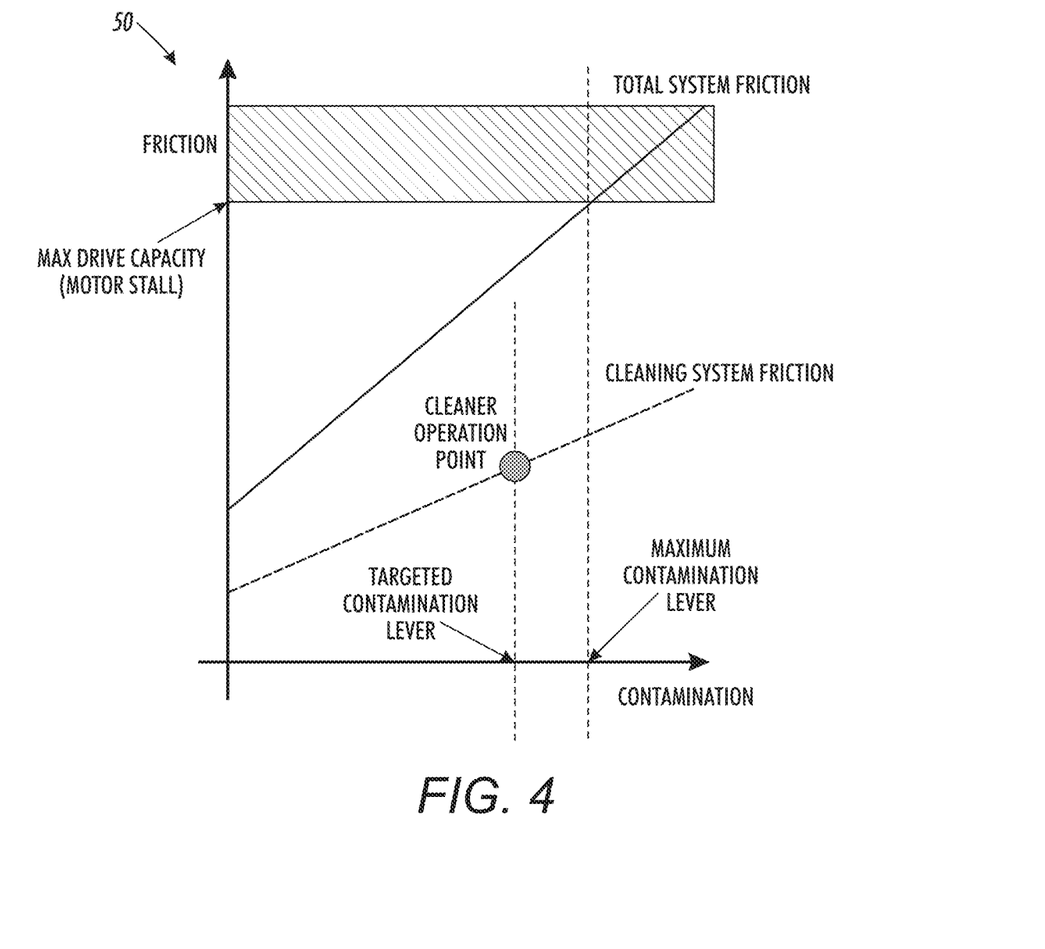
FIG. 4 illustrates a graph depicting system operating considerations, in accordance with an embodiment.

FIG. 4 illustrates a graph 50 depicting system operating considerations, in accordance with an example embodiment. That is, in order to set the correct friction/torque limit for the disclosed cleaner, the system-operating window can be considered. Graph 50 in FIG. 4 demonstrates that from a total system friction versus contamination curve, the maximum contamination level that the printing system can tolerate before a printing system motor stalls, can be derived. Graph 50 also demonstrates that a sufficient margin from this maximum contamination may be left and a targeted contamination level set. In addition, from the cleaner friction versus contamination curve shown in graph 50 of FIG. 4, the friction/torque corresponding to the targeted contamination level can be selected.

One concern, however, can involve setting too low a friction. That is, the cleaning can depend on the sliding friction. If the threshold is too low, the cleaner rolls most of the time and the rate of cleaning (e.g., ink debris transfer rate to the cleaner) may be decreased. When this rate is too low compared to the ink debris generation, however, the cleaner may become insufficient. So, it is important to maintain sliding friction between the belt and the cleaner most of the time. To maintain a cleaner belt (i.e., a lower contamination level), an alternative approach may involve increasing the contact area.

Figure 5:
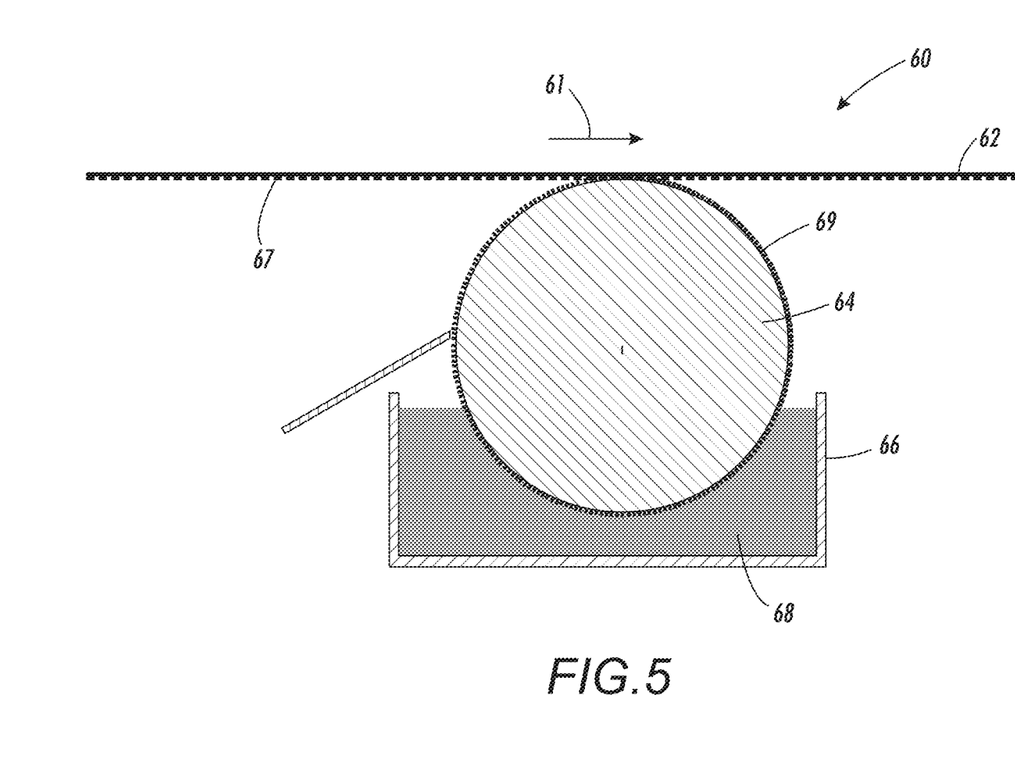
FIG. 5 illustrates a schematic diagram depicting a self-advancing cleaner, in accordance with an embodiment.

FIG. 5 illustrates a schematic diagram depicting a self-advancing cleaner 60, in accordance with an example embodiment. The self-advancing cleaner 60 can be implemented in the context of a printing system that includes a marking engine (not shown in FIG. 5), and can include a transport belt 62 and a rotatable member 64, which may be a roller or a drum. The marking engine can apply a marking medium such as ink or toner, to a substrate such as paper, using, for example, a laser, inkjet, and thermal or other transfer process.

The configuration shown in FIG. 5 can be implemented in the context of a cleaning roll arrangement. An arrow 61 shown in FIG. 5 indicates the movement of the transport belt 62 in a left to right direction. A container 68 can maintain a cleaning solution 68. Ink debris 67 is shown on the transport belt 62. Additional ink debris 69 is shown on a cleaning surface of the rotatable member 64.

The self-advancing cleaner 60 can carry the ink debris 69, for example, into the cleaning solution 68, wherein the ink debris 69 can dissolve into the cleaning solution 68. Other techniques for removing the ink debris 69 can also be implemented in association with the embodiment shown in FIG. 5. For example, techniques such as agitation, scraping, sticky transfer and so on, can be employed with the embodiment depicted in FIG. 5. Once the cleaning surface is refreshed, it can be reused to pick up ink debris.

Figure 6:
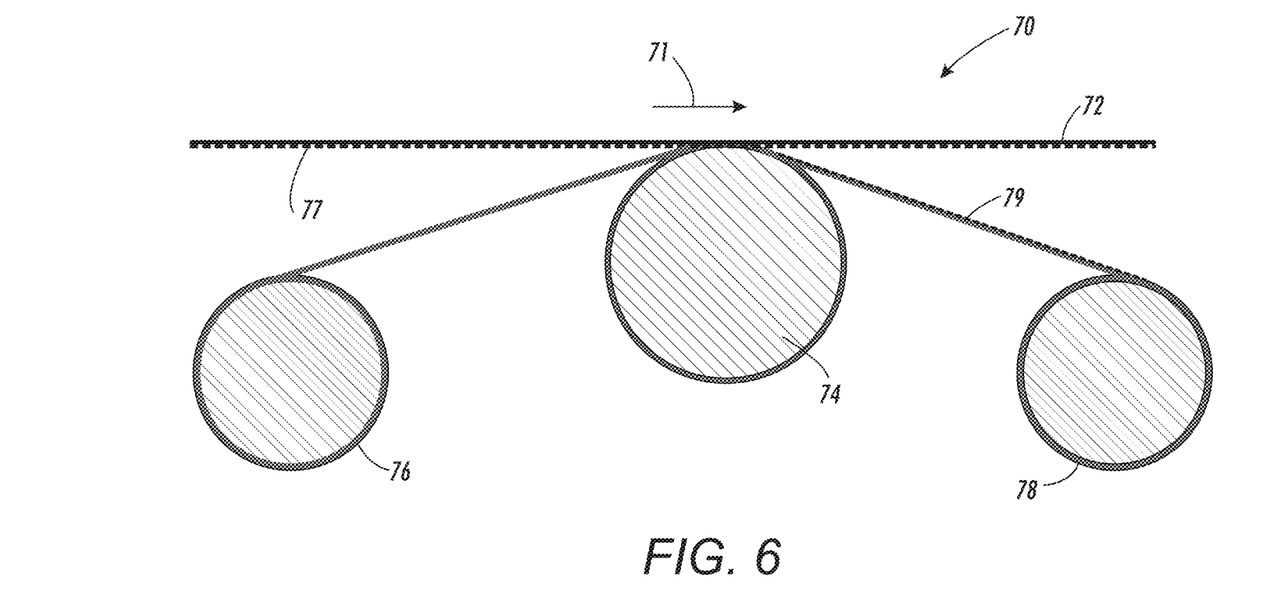
FIG. 6 illustrates a schematic diagram depicting a self-advancing cleaner, in accordance with an alternative embodiment.

FIG. 6 illustrates a schematic diagram depicting a self-advancing cleaner 70, in accordance with another embodiment. The configuration shown in FIG. 6 can be implemented as a transport web arrangement, which is different from the roller arrangement shown in FIG. 6. The self-advancing cleaner 70 shown in FIG. 6 can include a transport belt 72, which is shown in FIG. 6 as contaminated with ink debris 77.

A transport member 74 can be implemented in association with a rotatable member 76 (e.g., a roller) and a rotatable member 78 (e.g. also a roller). The direction of movement of the transport belt 72 is indicated by arrow 71 shown in FIG. 6. The embodiment shown in FIG. 6 is similar to the embodiment shown in FIG. 5 with the addition of the rotatable member 76 and the rotatable member 78. Instead of a roll surface used for cleaning the transport belt 72, the surface of a web material can be used to perform a similar cleaning function and take ink debris 79 away from the transport belt 72. The ink debris contaminated web material can be collected at, for example, the roller or rotatable member 78 and disposed as a consumable. (Note: the web is not cleaned and reused). That is, the web material (or web materials) are not cleaned and reused. Such web material (along with the ink debris) can be disposed once it reaches the end.

Contamination caused friction can be employed to self-advance the disclosed self-advancing cleaner. The self-advancing cleaner can utilize self-sensing and self-control through a wet friction process, which can be referred to as self-regulated wet friction. Additionally, preset torque/friction can allow the overall system to operate under functional conditions. Controls are not necessary for such embodiments. In addition, the disclosed embodiments can be implemented for self-cleaning in roll implementations or cleaning web implementations.

FIG. 7 illustrates a pictorial diagram depicting an example printing system 110 in which an embodiment may be implemented. In some embodiments, the printing system 110 can be implemented as an aqueous inkjet printer. The printing system 110 shown in FIG. 7 can include a number of sections or modules, such as, for example, a sheet feed module 111, a print head and ink assembly module 112, a dryer module 113 and a production stacker 114. The sheet feed module can include an upper tray 117 and a lower tray 119, which can hold media such as paper. Such modules can be composed of physical hardware components, but in some cases may include the use of software or may be subject to software instructions.

It should be appreciated that the printing system 110 depicted in FIG. 7 represents one example of an aqueous inkjet printer that can be adapted for use with one or more embodiments. The particular configuration and features shown in FIG. 7 should not be considered limiting features of the disclosed embodiments. That is, other types of printers can be implemented in accordance with different embodiments. For example, the printing system 110 depicted in FIG. 1 can be configured as a printer that uses water-based inks or solvent-based inks, or in some cases may utilize toner ink in the context of a LaserJet printing embodiment.

In an embodiment, the sheet feed module 111 of the printing system 110 can be configured to hold, for example, 2,500 sheets of 90 gsm, 4.0 caliper stock in each of two trays. With 5,000 sheets per unit and up to 4 possible feeders in such a configuration, 20,000 sheets of non-stop production activity can be facilitated by the printing system 110. The sheet feed module can include an upper tray 17 that holds, for example, paper sizes 8.27"×10"/210 mm×254 mm to 14.33"×20.5"/364 mm×521 mm, while a lower tray 19 can hold paper sizes ranging from, for example, 7"×10"/178 mm×254 mm to 14.33"×20.5"/364 mm×521 mm. Each feeder can utilize a shuttle vacuum feed head to pick a sheet off the top of the stack and deliver it to a transport mechanism.

In an embodiment, the print head and ink assembly module 112 of the printing system 110 can include a plurality of inkjet print heads that can be configured to deliver four different drop sizes through, for example, 7,870 nozzles per color to produce prints with, for example, a 600×600 dpi. An integrated full-width scanner can enable automated print head adjustments, missing jet correction and image-on-paper registration. Operators can make image quality improvements for special jobs such as edge enhancement, trapping, and black overprint. At all times automated checks and preventative measures can maintain the press in a ready state and operational.

The dryer module 113 of the printing system 110 can include a dryer. After printing, the sheets can move directly into a dryer where the paper and ink are heated with seven infrared carbon lamps to about 90° C. (194° F.). This process can remove moisture from the paper so that the sheets are sufficiently stiff to move efficiently through the paper path. The drying process can also remove moisture from the ink to prevent it from rubbing off. A combination of sensors, thermostats, thermistors, thermopiles, and blowers can accurately heat these fast-moving sheets, and can maintain a rated print speed.

The production stacker 114 can include a finisher that can run continuously as it delivers up to 2,850 sheets at a time. Once unloaded, the stack tray can return to the main stack cavity to pick and deliver another load—continuously. The stacker 114 can provide an adjustable waist-height for unloading from, for example, 8" to 24", and a by-pass path with the ability to rotate sheets to downstream devices. The production stacker 14 can also be configured with, for example, a 250-sheet top tray for sheet purge and samples, and can further include an optional production media cart to ease stack transport. One non-limiting example of printing system 110 is the Xerox® Brenva® HD Production Inkjet Press, a printing product of Xerox Corporation. The printing system can include transport members including the transport belts discussed herein and/or other features including for example a Brenva®/Fervent® marking transport, which is also a product of Xerox Corporation.

As can be appreciated by one skilled in the art, embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in procedural programming languages or in a visually oriented programming environment.

The program code may execute entirely on a user's computer, partly on a user's computer, as a stand-alone software package, partly on a user's computer and partly on a remote computer or entirely on the remote computer. In the latter scenario, the remote computer may be connected to a user's computer through a bidirectional data communications network (e.g., a local area network (LAN), wide area network (WAN), wireless data network, a cellular network, etc.) or the bidirectional connection may be made to an external computer via most third party supported networks (e.g., through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
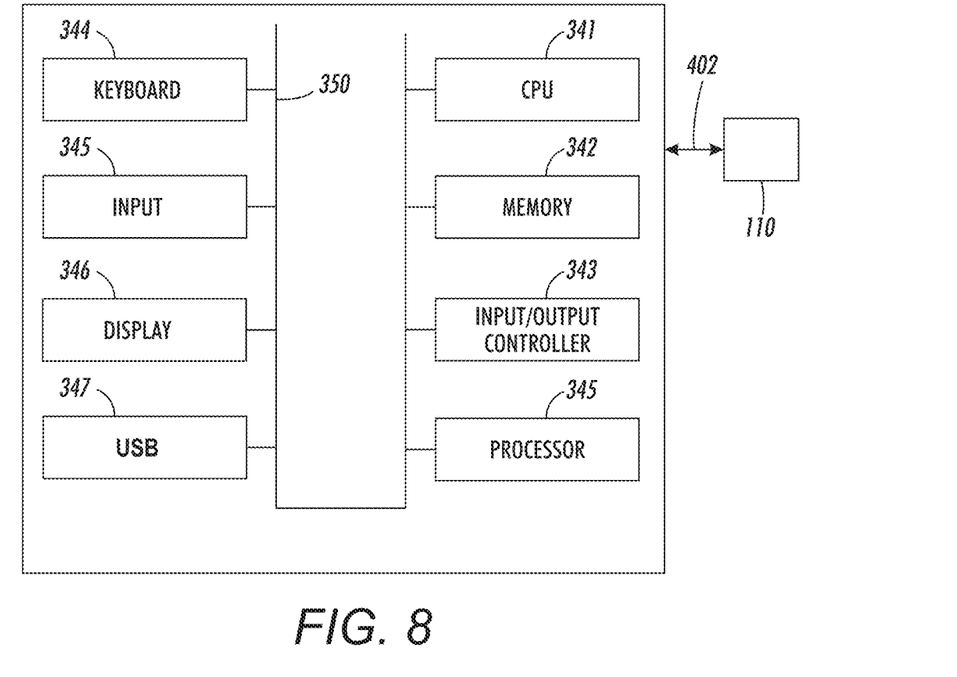
FIG. 8 illustrates a schematic view of a computer system, in accordance with an embodiment.
Figure 9:
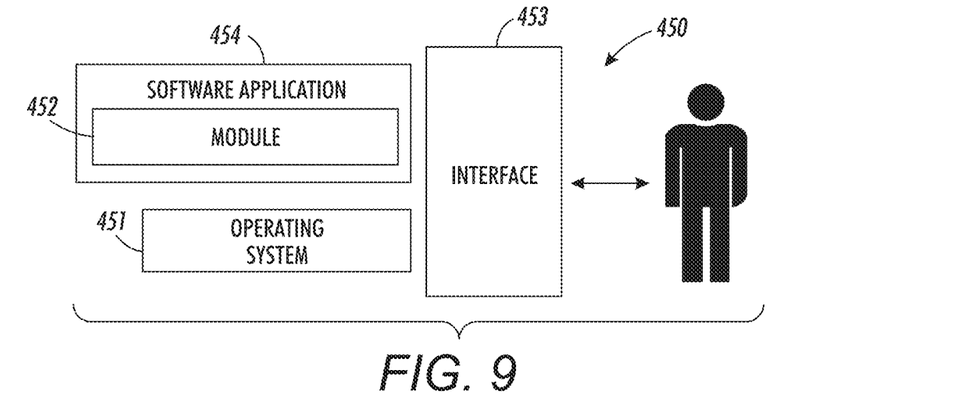
FIG. 9 illustrates a schematic view of a software system including a module, an operating system, and a user interface, in accordance with an embodiment.

FIGS. 8-9 are shown only as exemplary diagrams of data-processing environments in which example embodiments may be implemented. It should be appreciated that FIGS. 8-9 are only exemplary and are not intended to assert or imply any limitation with regard to the environments in which aspects or embodiments may be implemented. Many modifications to the depicted environments may be made without departing from the spirit and scope of the disclosed embodiments.

As illustrated in FIG. 8, some embodiments may be implemented in the context of a data-processing system 400 that can include, for example, one or more processors including a CPU (Central Processing Unit) 341 and/or other another processor 349 (e.g., microprocessor, microcontroller etc), a memory 342, an input/output controller 343, a peripheral USB (Universal Serial Bus) connection 347, a keyboard 344 and/or another input device 345 (e.g., a pointing device such as a mouse, trackball, pen device, etc.), a display 346 (e.g., a monitor, touch screen display, etc) and/or other peripheral connections and components. FIG. 9 is an example of a computing device that can be adapted for use in accordance with one possible embodiment.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device, a networked computer server, and so on, wherein each such device can be operably connected to and/or in communication with a client-server based network or other types of networks (e.g., cellular networks, Wi-Fi, etc). The data-processing 400 can communicate with other devices or systems (e.g., the printing system 110). Communication between the data-processing system 400 and the printing system 110 can be bidirectional, as indicated by the double arrow 402. Such bidirectional communications may be facilitated by, for example, a computer network, including wireless bidirectional data communications networks.

FIG. 9 illustrates a computer software system 450 for directing the operation of the data-processing system 400 depicted in FIG. 8. Software application 454, stored for example in the memory 342 can generally include one or more modules, an example of which is module 452. The computer software system 450 also can include a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or can terminate a session. The software application 454 can include module(s) 452, which can, for example, implement instructions or operations such as those discussed herein with respect to FIG. 1 to FIG. 7. Module 452 may also be composed of a group of modules and/or sub-modules.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. A module may be composed of two parts: an interface, which lists the constants, data types, variable, and routines that can be accessed by other modules or routines, and an implementation, which may be private (e.g., accessible only to that module) and which can include source code that actually implements the routines in the module. The term module can also refer to an application, such as a computer program designed to assist in the performance of a specific task, such as word processing, accounting, inventory management, etc. A module may also refer to a physical hardware component or a combination of hardware and software. The previously discussed dryer module 113 is an example of a physical hardware component that can also operate according to instructions provided by a module such as module 452.

Module 452 may include instructions (e.g., steps or operations) for performing operations such as those discussed herein. For example, module 452 may involve instructions for operating the self-advancing cleaner 60 shown in FIG. 5, the self-advancing cleaner 70 shown in FIG. 6, and the printing system 110 shown in FIG. 7.

For example, such instructions may include steps or operations for operating a self-advancing cleaner including engaging a surface of a transport belt with a rotatable member having a cleaning surface that includes a web material, wherein as the rotatable member rotates, the web material of the cleaning surface engages a surface of a transport belt and collects ink debris located on the surface of the transport belt and takes the ink debris away from the transport belt for disposal of web material with the ink debris as a consumable.

In another embodiment, such instructions can include steps or operations for engaging the surface of a transport belt with a rotatable member having a cleaning surface that engages the surface of the transport belt, wherein ink debris located on the surface of the transport belt is collected on the cleaning surface of the rotatable member, and wherein as the rotatable member rotates, the cleaning surface of the rotatable member enters a container having a cleaning solution and carries the ink debris into the cleaning solution, wherein the ink debris can be dissolved into the cleaning solution.

In yet another embodiment, such instructions can involve steps or operations for operating the disclosed self-advancing cleaner. As discussed previously, the cleaning surface can be rough in order to collect ink waste. Steps or operations for operating the disclosed self-advancing cleaner can include a step or operation wherein during a cleaning operation, the cleaning surface is stationary while the belt is moving such that there is a sliding relative motion and the ink waste get collected on the cleaning surface. Once the ink contamination level reaches a certain level, the set friction exceeds a threshold, which causes the disclosed self-advancing cleaner to advance. The two implementations discussed herein (i.e., consumed and reused cleaning surfaces) can follow these steps, instructions or operations.

Based on the foregoing, it can be appreciated that a variety of embodiments are disclosed herein. In an embodiment, a self-advancing cleaner can include a rotatable member that engages a transport belt, wherein the rotatable member includes a cleaning surface that takes ink debris away from the transport belt through self-regulated wet friction. In another embodiment of the self-advancing cleaner, the cleaning surface of the rotatable member can include a web material, wherein as the rotatable member rotates, the web material of the cleaning surface engages a surface of the transport belt and collects ink debris located on the surface of the transport belt and takes the ink debris away from the transport belt for disposal of the web material with the ink debris as a consumable.

In some embodiments of the self-advancing cleaner, the rotatable member can be configured as a roller. In another embodiment of the self-advancing cleaner, the web material may be located on the cleaning surface of the rotatable member. In still another embodiment of the self-advancing cleaner, the rotatable member can be configured to include at least one rotatable member among a plurality of rotatable members in a transport web arrangement.

In another embodiment of the self-advancing cleaner, contamination caused friction resulting from contamination by the ink debris causes the self-advancing cleaner to advance. In still another embodiment, a preset torque can allow the self-advancing cleaner to operate under functional conditions. In yet another embodiment of the self-advancing cleaner, a preset friction can allow the self-advancing cleaner to operate under functional conditions.

In another embodiment of the self-advancing cleaner, the cleaning surface can be configured to be de-inked and reusable. In yet another embodiment of the self-advancing cleaner, the cleaning surface can be reusable in a form of a roll or a belt.

Another embodiment of the self-advancing cleaner can include a rotatable member that engages a transport belt, wherein the rotatable member includes a cleaning surface comprising a surface sufficiently rough to collect and take away ink debris from the transport belt, wherein during a cleaning operation the cleaning surface remains stationary while the transport belt moves in a sliding relative motion with respect to the cleaning surface, which allows the ink debris to be collected on the cleaning surface, and wherein once an ink contamination level associated with the ink debris attains a threshold and a set friction exceeds the threshold, the self-advancing cleaner advances.

In an embodiment of the aforementioned self-advancing cleaner, the cleaning surface of the rotatable member can include a web material, wherein as the rotatable member rotates, the web material of the cleaning surface engages a surface of the transport belt and collects the ink debris located on the surface of the transport belt and takes the ink debris away from the transport belt for disposal of the web material with the ink debris as a consumable. In still another embodiment of the aforementioned self-advancing cleaner, the cleaning surface can configured to be de-inked and reusable. In yet another embodiment of the aforementioned self-advancing cleaner the cleaning surface can be reusable in a form of a roll. In still another embodiment of the aforementioned, self-advancing cleaner, the cleaning surface can be reusable in a form of a belt.

In another embodiment, a method of operating a self-advancing cleaner, can involve steps, instructions or operations including engaging a transport belt with a rotatable member, wherein the rotatable member includes a cleaning surface comprising a surface sufficiently rough to collect and take away ink debris from the transport belt, and facilitating a cleaning operation wherein the cleaning surface remains stationary while the transport belt moves in a sliding relative motion with respect to the cleaning surface to allow the ink debris to be collected on the cleaning surface, wherein once an ink contamination level associated with the ink debris attains a threshold and a set friction exceeds the threshold, the self-advancing cleaner advances.

In an embodiment of the method of operation, the cleaning surface of the rotatable member can include a web material, wherein as the rotatable member rotates, the web material of the cleaning surface engages a surface of the transport belt and collects the ink debris located on the surface of the transport belt and takes the ink debris away from the transport belt for disposal of the web material with the ink debris as a consumable. In another embodiment of the method of operation, cleaning surface is can be configured to be de-inked and reusable. In still another embodiment of the method of operation, the cleaning surface can be configured to be reusable in a form of at least one of: a roll or a belt.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A self-advancing cleaner, comprising:
 a rotatable member that engages a transport belt, wherein the rotatable member includes a cleaning surface that takes ink debris away from the transport belt through self-regulated wet friction; and
 a web material, wherein the cleaning surface of the rotatable member includes the web material, wherein as the rotatable member rotates, the web material of the cleaning surface engages a surface of the transport belt and collects ink debris located on the surface of the transport belt and takes the ink debris away from the transport belt for disposal of the web material with the ink debris as a consumable, wherein contamination caused friction resulting from contamination by the ink debris causes the self-advancing cleaner to advance.

2. The self-advancing cleaner of claim 1 further comprising a printing system, wherein the printing system includes the rotatable member and the transport belt.

3. The self-advancing cleaner of claim 2 wherein the printing system includes at least one of: an aqueous inkjet printer and a laserjet printer.

4. The self-advancing cleaner of claim 1 wherein the rotatable member comprises a roller.

5. The self-advancing cleaner of claim 1 wherein the web material is located on the cleaning surface of the rotatable member.

6. The self-advancing cleaner of claim 1 wherein the rotatable member comprises at least one rotatable member among a plurality of rotatable members in a transport web arrangement.

7. The self-advancing cleaner of claim 1 wherein a preset torque allows the self-advancing cleaner to operate under functional conditions.

8. The self-advancing cleaner of claim 1 wherein a preset friction allows the self-advancing cleaner to operate under functional conditions.

9. The self-advancing cleaner of claim 1 wherein the cleaning surface is configured to be de-inked and reusable.

10. The self-advancing cleaner of claim 9 wherein the cleaning surface is reusable in a form of a roll.

11. The self-advancing cleaner of claim 9 wherein the cleaning surface is reusable in a form of a belt.

12. A self-advancing cleaner, comprising:
a rotatable member that engages a transport belt, wherein the rotatable member includes a cleaning surface comprising a surface sufficiently rough to collect and take away ink debris from the transport belt, wherein during a cleaning operation the cleaning surface remains stationary while the transport belt moves in a sliding relative motion with respect to the cleaning surface, which allows the ink debris to be collected on the cleaning surface, and wherein once an ink contamination level associated with the ink debris attains a threshold and a set friction exceeds the threshold, the self-advancing cleaner advances.

13. The self-advancing cleaner of claim 12 wherein the cleaning surface of the rotatable member includes a web material, wherein as the rotatable member rotates, the web material of the cleaning surface engages a surface of the transport belt and collects the ink debris located on the surface of the transport belt and takes the ink debris away from the transport belt for disposal of the web material with the ink debris as a consumable.

14. The self-advancing cleaner of claim 12 wherein the cleaning surface is configured to be de-inked and reusable.

15. The self-advancing cleaner of claim 12 wherein the cleaning surface is reusable in a form of a roll.

16. The self-advancing cleaner of claim 12 wherein the cleaning surface is reusable in a form of a belt.

17. A method of operating a self-advancing cleaner, comprising:
engaging a transport belt with a rotatable member, wherein the rotatable member includes a cleaning surface comprising a surface sufficiently rough to collect and take away ink debris from the transport belt;
facilitating a cleaning operation wherein the cleaning surface remains stationary while the transport belt moves in a sliding relative motion with respect to the cleaning surface to allow the ink debris to be collected on the cleaning surface, wherein once an ink contamination level associated with the ink debris attains a threshold and a set friction exceeds the threshold, the self-advancing cleaner advances.

18. The method of claim 17 wherein the cleaning surface of the rotatable member includes a web material, wherein as the rotatable member rotates, the web material of the cleaning surface engages a surface of the transport belt and collects the ink debris located on the surface of the transport belt and takes the ink debris away from the transport belt for disposal of the web material with the ink debris as a consumable.

19. The method of claim 17 wherein the cleaning surface is configured to be de-inked and reusable.

20. The method of claim 17 wherein the cleaning surface is configured to be reusable in a form of at least one of: a roll or a belt.

* * * * *